Feb. 22, 1949.        F. W. BENEDICT        2,462,595
SCREENING
Filed Aug. 3, 1945

INVENTOR
FREMONT W. BENEDICT
BY
Pennie, Davis, Marvin & Edmonds
ATTORNEYS

Patented Feb. 22, 1949

2,462,595

UNITED STATES PATENT OFFICE 2,462,595

SCREENING

Fremont W. Benedict, Upper Darby, Pa.

Application August 3, 1945, Serial No. 608,719

3 Claims. (Cl. 210—150)

This invention relates to the screening of liquids containing solids, and has for its object the provision of an improved method of and apparatus for screening such liquids.

The invention is particularly applicable to the treatment of large volumes of liquid containing solid particles of various sizes, and aims to remove the bulk of the solids from the liquid in an expeditious and inexpensive manner. According to the invention, the liquid containing solids is passed through a portable receptacle or basket having a perforated wall restraining the passage therethrough of the bulk of the solids and into a basin or other enclosed space surrounding the receptacle and having a normal operating liquid level somewhat below the top of the receptacle. When the solids restrained in the receptacle attain a predetermined concentration, the liquid level in the basin is gradually lowered and the solids in the receptacle are thereby further concentrated. The thus-concentrated solids are then removed from the receptacle, and the receptacle is ready for a repetition of the screening cycle.

In the preferred form of the invention, the receptacle has an imperforate enclosing wall and a perforated bottom and is adapted to be lowered into screening position in a suitable basin with its perforated bottom spaced from the bottom of the basin. The liquid to be screened is continuously supplied to the receptacle, preferably near its bottom and in a manner to impart a swirling movement to the liquid within the receptacle. The bulk of the solids are restrained by the perforated bottom while the liquid passes therethrough and flows upwardly around the receptacle to an overflow weir associated with the basin and at a level somewhat below the top of the receptacle. When the restrained solids attain a predetermined concentration, the level of liquid in the basin is lowered thereby further concentrating the solids in the receptacle. The receptacle is then removed from the basin, emptied of solids and returned to the same or a similar basin for a repetition of the screening cycle.

Figure 1:
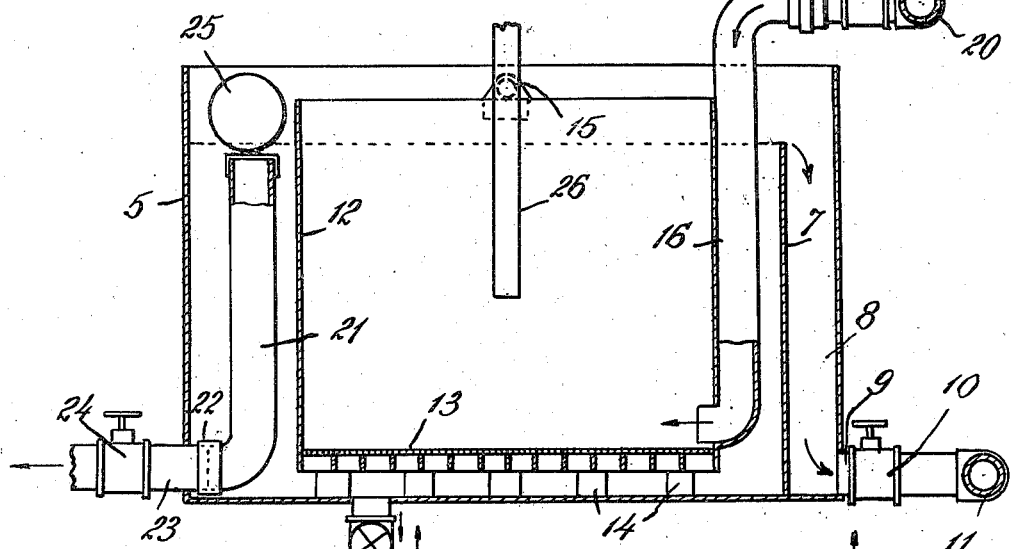
Figure 2:
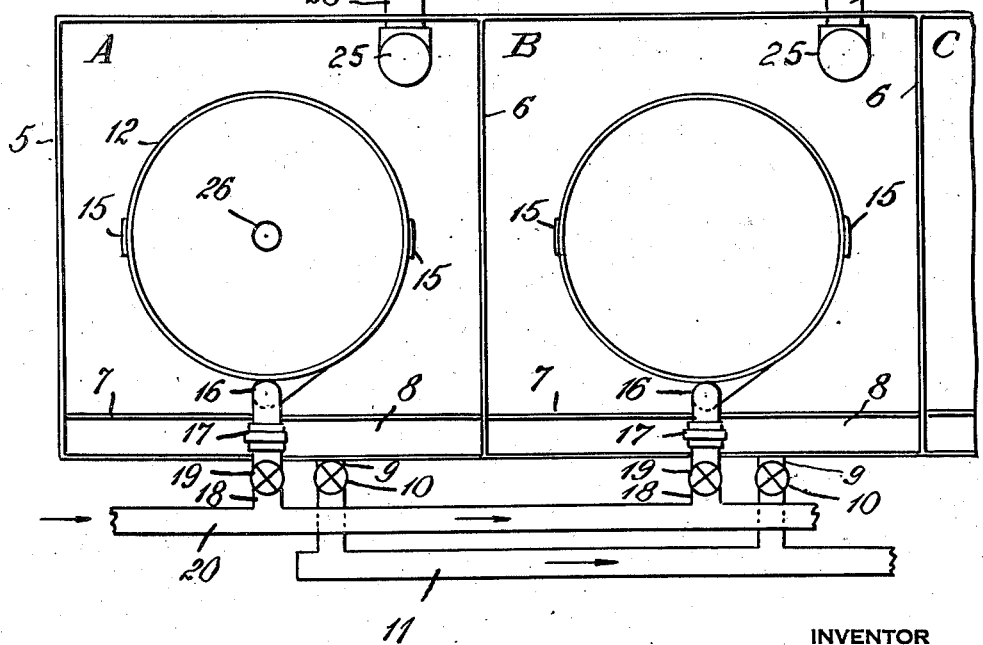

The foregoing and other novel features of the invention will be best understood from the following description taken in conjunction with the accompanying drawing, in which Fig. 1 is a sectional end elevation of an apparatus embodying the invention, and Fig. 2 is a top plan of the apparatus.

The apparatus shown in the drawing comprises an elongated basin 5 divided by transverse partitions 6 into a plurality of individual screening compartments or basins A, B, C, etc. Each screening compartment has a weir 7 spaced from the adjacent side wall of the basin and providing therewith a liquid discharge channel 8. A liquid discharge pipe 9 communicates with each channel 8, and is provided with a control valve 10. The pipes 9 are connected to a common liquid discharge main 11.

The portable screening receptacle or basket has an imperforate circular enclosing wall 12 and a perforated bottom 13. The receptacle is provided with supporting legs 14 which suitably space the perforated bottom from the bottom of the basin, a space of about four inches being generally satisfactory. The receptacle has eyes, hooks or the like 15 for lowering it into operative screening position within the basin and for raising it out of the basin when the solids therein are to be dumped.

The receptacle has a self-contained liquid inlet pipe 16 permanently attached to its wall 12 and communicating with the receptacle near the bottom thereof and hence just above the perforated bottom 13. The communication between the pipe 16 and the receptacle is such that the liquid enters the receptacle tangentially and hence induces and imparts a swirling movement to the liquid within the receptacle. The upper end of the inlet pipe 16 is removably coupled as indicated at 17 to a pipe 18 having a valve 19 and connected to a header 20 for supplying the liquid to be screened to the various screening receptacles of the apparatus.

Each screening compartment has an auxiliary liquid discharge outlet for lowering the liquid level in the compartment. This outlet comprises a pipe 21 within the basin having a swivel connection 22 with an outlet pipe 23 near the bottom of the basin and provided with a valve 24. A float 25 is operatively connected to the open upper or inlet end of the pipe 21 and is adapted to maintain this end of the pipe just below the liquid level in the basin. The outlet pipe 21 has a somewhat greater capacity than the inlet pipe 16.

In accordance with the method of the invention, with the screening receptacle in its operative position within the basin and with valve 24 closed and valves 10 and 19 open, liquid to be screened is supplied continuously to the receptacle through the pipe 16. The bulk of the solids are restrained from passing through the perforated bottom 13 while the liquid passes freely therethrough and upwardly around the receptacle and overflows the weir 7 into the discharge channel 8 and thence into the discharge main 11. The top of the weir 7 is advantageously about a foot lower than the top of the imperforate wall 12 of the screening receptacle. The swirling movement imparted to the liquid in the receptacle by the tangentially directed outlet of the pipe 16 keeps the solids more or less in suspension and inhibits to a large extent clogging of the orifices of the perforated bottom. The concentration of solids within the receptacle progressively builds up and when it attains a predetermined value the procedure is altered to further concentrate the solids in the receptacle preparatory to its removal from the basin. This involves lowering the liquid level in the basin whereby the liquid level in the receptacle is correspondingly lowered and the ratio of solids to liquid in the receptacle is increased with consequent concentration of the solids.

The lowering of the liquid level in the basin is effected by opening the valve 24 whereby liquid is withdrawn from the basin through the pipe 21. The valve 10 is preferably closed prior to the opening of the valve 24 in order to prevent any back-flow of screened liquid from the main 11. The inlet of the pipe 21 is held by the float 25 just below the liquid level, so that the liquid withdrawn through this pipe is adequately screened and may be admixed with the screened liquid from the discharge main 11. Since the pipe 21 has somewhat greater capacity than the inlet pipe 16, opening of the valve 24 will automatically lower the liquid level in the basin while the supply of liquid continues through the pipe 16. The rate of lowering of the liquid level can be regulated by manipulation of the valve 19, being lowest when this valve is fully open and greatest when the valve is closed. Usually, it is desirable to maintain some supply of liquid through the pipe 16 during the lowering of the liquid level in the basin, because this effects a more gradual lowering of the liquid level and maintains within the receptacle normal screening conditions (i. e. swirling of liquid and suspension of solids) and avoids clogging of the perforated bottom. However, with some types of solids, and where it is advantageous to lower the liquid level in the basin at a rapid rate, the valve 19 may be closed upon the opening of the valve 24. The liquid in the receptacle then becomes relatively quiescent and the solids tend to settle towards the perforated bottom and provide a screening medium through which liquid drains by gravity as the level of the liquid in the basin is lowered at a relatively rapid rate.

Irrespective of the rate at which the liquid level in the basin is lowered, substantially all of the solids are retained in the receptacle and the concentration of solids increases as liquid drains through the perforated bottom. When the solids in the receptacle have thus been further concentrated to the desired extent, the valve 19 (if still open) is closed, the valve 24 is closed, and the receptacle is raised from the basin, the coupling 17 having previously been opened or disconnected to free the pipe 16 from the pipe 18. The solids are then removed from the receptacle, and the empty receptacle is returned to the same or a similar basin.

In the complete apparatus illustrated in the drawing, the screening receptacles in the various compartments A, B, C, etc. are operating at progressively different stages in their respective screening cycles, so that the receptacles are emptied of solids and replaced in succession and at regular intervals. Thus, the supply of liquid to be screened and the delivery of screened liquid is continuous and of substantially uniform volume. While I prefer to divide the elongated basin into separate compartments, the partitions 6 may be omitted, but in such case the level of liquid will be lowered throughout the entire basin each time a receptacle is taken out for the removal of solids. Where continuous operation is of no particular advantage, such operation of the apparatus might not be objectionable, and the apparatus might even be intermittently operated, with all receptacles being emptied and replaced at the same time.

For smaller volumes of liquid, a single compartment or basin may be adequate, in which case the operation will be intermittent or batch. Both the receptacle and basin may be of any desired configuration, such as round, square, rectangular or otherwise shaped. The imperforate enclosing wall may advantageously be made of sheet metal of adequate thickness and strength for the required service. The perforated bottom may be constructed in various ways with openings or orifices of appropriate size for the particular type of solids to be screened from the liquid. Thus, the size of the orifices will be determined by the nature and particle size of the solids to be removed from the liquid. For the general run of trade waste liquors, orifices of about $\frac{1}{32}$ inch are usually satisfactory, but it is to be understood that the orifices may be smaller or larger as circumstances require. The perforated bottom must have adequate strength to hold the weight of solids when removing the receptacle. Adequate strength can be given the bottom by constructing it of suitable combinations of reinforced metal strip, slotted metal and the like with wire mesh screen, woven wire cloth and the like to give the degree of screening desired. A hoist or other suitable lifting device may be provided for lifting the receptacle and the solids concentrated therein from the basin and for lowering the receptacle into operative screening position in the basin.

Occasionally it is of advantage to separate some of the lighter weight solids from heavier solids, and in such cases an outlet pipe 26 may be dropped centrally into the receptacle to a depth about midway of the liquid therein. Liquid is then withdrawn through the pipe 26 by a pump, advantageously of the pulsometer type. Due to the swirling movement of the liquid in the receptacle, the lighter solids tend to concentrate approximate the central vertical axis of the receptacle, and may thus be conveniently withdrawn through the pipe 26. The amount of liquid and suspended lighter solids withdrawn through the pipe 26 may generally be about 25% of the total flow of liquid through the receptacle. The withdrawn liquid containing the lighter solids is supplied to another screening apparatus of the invention for the separation of the lighter solids in the manner hereinbefore described. Such a separation of the lighter solids and their subsequent concentration may be advantageously practiced in the removal of coal from silt and the like in streams contiguous to coal mines.

The invention may be practiced with advantage for the removal of the bulk of the solids from sewage, paper pulp mill waters, and trade waste liquors in general. It is of special advantage for the removal of solids from cannery and similar industrial effluents which would otherwise pollute the streams into which they are run. In most instances the screened liquid may contain a small amount of finely divided or colloidal solids which may be removed, where desired or necessary, by subsequent treatment, such as filtering, centrifuging, sedimentation etc. In this respect the practice of the invention may be considered as a roughing out operation reducing the load on the subsequent treatment of the liquid.

I claim:

1. An apparatus for screening a liquid containing solids comprising a relatively stationary basin having an inside overflow weir spaced from the adjacent wall of the basin and providing therewith a liquid discharge channel, a discharge outlet in liquid communication with said channel near the bottom thereof, a portable receptacle having an imperforate enclosing wall and a perforated bottom adapted to be lowered into operative position within said basin with its perforated bottom spaced from the bottom of the basin and with the top of its imperforate wall at a higher level than said liquid discharge, means connected with said receptacle for supplying above and approximate the bottom thereof a liquid containing solids, a liquid discharge outlet communicating with said basin near the bottom thereof and having a control valve, a liquid discharge pipe within the basin and having a swivel connection with said discharge outlet, and means for maintaining the inlet of said discharge pipe approximate the liquid level in said basin.

2. An apparatus for screening a liquid containing solids comprising a relatively stationary basin having a liquid discharge approximate its top, a portable receptacle having an imperforate enclosing wall and a perforated bottom adapted to be lowered into operative position within said basin with its perforated bottom spaced from the bottom of the basin and with the top of its imperforate wall at a higher level than said liquid discharge, a second liquid discharge for said basin having a control valve, means for maintaining the inlet of said second liquid discharge approximate the liquid level in the basin, a liquid inlet associated with said receptacle and tangentially communicating therewith above and approximate its perforated bottom, and means for removably coupling said inlet to a source of supply of liquid to be screened.

3. An apparatus for screening a liquid containing solids comprising a relatively stationary basin having an inside overflow weir spaced from the adjacent wall of the basin and providing therewith a liquid discharge channel, a discharge outlet in liquid communication with said channel, a portable receptacle adapted to be bodily removed from said basin and having an imperforate enclosing wall extending upwardly to a height above the top of said weir and having a perforated bottom spaced from the bottom of the basin when the receptacle is operatively positioned therein, means for supplying to the receptacle above its perforated bottom the liquid to be screened, and a second discharge outlet in liquid communication with said basin at approximately the liquid level therein.

FREMONT W. BENEDICT.

REFERENCES CITED

The following references are of record in the file of this patent:

UNITED STATES PATENTS

| Number | Name | Date |
| --- | --- | --- |
| 594,847 | Bennett et al. | Dec. 7, 1897 |
| 617,057 | Sieben | Jan. 3, 1899 |
| 1,017,100 | Jones | Feb. 13, 1912 |
| 1,237,069 | Loeb | Aug. 14, 1917 |
| 1,652,036 | McKesson | Dec. 6, 1927 |
| 1,743,524 | Cabrera | Jan. 14, 1930 |
| 1,743,525 | Cabrera | Jan. 14, 1930 |
| 2,010,435 | Matheson | Aug. 6, 1935 |
| 2,044,096 | Moran | June 16, 1936 |
| 2,260,920 | Shenk | Oct. 28, 1941 |

FOREIGN PATENTS

| Number | Country | Date |
| --- | --- | --- |
| 10,865 | Great Britain | 1891 |